US010992004B2

(12) United States Patent
Wong et al.

(10) Patent No.: US 10,992,004 B2
(45) Date of Patent: Apr. 27, 2021

(54) ELECTRIC VEHICLE SOLID STATE BATTERY CELL

(71) Applicant: TeraWatt Technology Inc., Santa Clara, CA (US)

(72) Inventors: Derek Nathan Wong, Santa Clara, CA (US); Scott Quinlan Freeman Monismith, Santa Clara, CA (US); Jeremy Elsberry, Santa Clara, CA (US); Brennan Campbell, Santa Clara, CA (US); Ying Liu, Santa Clara, CA (US); Yifan Tang, Santa Clara, CA (US)

(73) Assignee: TeraWatt Technology Inc., Santa Clara, CA (US)

( * ) Notice: Subject to any disclaimer, the term of this patent is extended or adjusted under 35 U.S.C. 154(b) by 203 days.

(21) Appl. No.: 16/234,847

(22) Filed: Dec. 28, 2018

(65) Prior Publication Data
US 2020/0212372 A1   Jul. 2, 2020

(51) Int. Cl.
| | | |
|---|---|---|
| *H01M 2/02* | (2006.01) | |
| *H01M 2/30* | (2006.01) | |
| *H01M 2/26* | (2006.01) | |
| *B60L 50/64* | (2019.01) | |
| *H01M 50/10* | (2021.01) | |

(Continued)

(52) U.S. Cl.
CPC ............ *H01M 50/10* (2021.01); *B60L 50/64* (2019.02); *H01M 50/531* (2021.01); *H01M 50/543* (2021.01); *H01M 2220/20* (2013.01)

(58) Field of Classification Search
CPC combination set(s) only.
See application file for complete search history.

(56) References Cited

U.S. PATENT DOCUMENTS 3,988,164 A * 10/1976 Liang ................... H01M 6/18
                                                        429/305
4,413,043 A * 11/1983 Steinleitner ............ C03C 3/091
                                                        429/104

(Continued)

FOREIGN PATENT DOCUMENTS

| CN | 202454657 U | 9/2012 |
| CN | 103066344 A | 4/2013 |
| WO | 2018-180768 A1 | 10/2018 |

*Primary Examiner* — Kaity V Chandler
(74) *Attorney, Agent, or Firm* — Kilpatrick Townsend & Stockton LLP

(57) ABSTRACT

A solid state battery cell can include a first polarity terminal, a second polarity terminal and a housing defining a cavity and functioning as a current collector for the first polarity terminal. The battery cell can include a membrane disposed in the cavity and dividing the cavity into a first portion and a second portion, an electrically conductive pin functioning as a current collector for the second polarity terminal, and an insulator electrically isolating the electrically conductive pin from the housing. A solid state anode material, including solid state anode particles, first solid state electrolyte particles and a first conductive additive, can be disposed in the first portion of the cavity. A solid state cathode material, including solid state cathode particles, second solid state electrolyte particles and a second conductive additive, can be disposed in the second portion of the cavity.

20 Claims, 7 Drawing Sheets

(51) Int. Cl.
*H01M 50/531* (2021.01)
*H01M 50/543* (2021.01)

(56) References Cited

U.S. PATENT DOCUMENTS

| | | | | |
|---|---|---|---|---|
| 4,822,701 | A * | 4/1989 | Ballard | H01M 6/181 |
| | | | | 429/313 |
| 4,833,048 | A * | 5/1989 | Dejonghe | H01M 4/60 |
| | | | | 429/104 |
| 5,001,023 | A * | 3/1991 | Cheshire | C08G 65/14 |
| | | | | 429/94 |
| 5,476,733 | A * | 12/1995 | Coetzer | H01M 4/582 |
| | | | | 429/103 |
| 5,558,961 | A * | 9/1996 | Doeff | H01M 4/505 |
| | | | | 429/224 |
| 8,343,661 | B2 * | 1/2013 | Galloway | H01M 4/42 |
| | | | | 429/229 |
| 8,735,003 | B2 * | 5/2014 | Kim | H01M 4/505 |
| | | | | 429/320 |
| 8,980,459 | B1 * | 3/2015 | Sammells | H01M 4/381 |
| | | | | 429/103 |
| 2013/0216894 | A1 * | 8/2013 | Wang | H01M 12/005 |
| | | | | 429/158 |
| 2016/0329594 | A1 | 11/2016 | Drews et al. | |
| 2017/0098864 | A1 | 4/2017 | Ebisuzaki et al. | |
| 2018/0114979 | A1 * | 4/2018 | Yoon | H01M 10/0562 |
| 2019/0006721 | A1 * | 1/2019 | Zhamu | H01G 11/36 |
| 2019/0181432 | A1 * | 6/2019 | Yui | H01M 10/0585 |
| 2019/0267666 | A1 * | 8/2019 | Shin | H01M 4/386 |
| 2020/0036070 | A1 * | 1/2020 | Li | H01G 11/28 |
| 2020/0075959 | A1 * | 3/2020 | Anandan | H01M 4/628 |
| 2020/0119357 | A1 * | 4/2020 | Hou | H01M 4/131 |
| 2020/0212372 | A1 * | 7/2020 | Wong | H01M 50/543 |

* cited by examiner

ELECTRIC VEHICLE SOLID STATE BATTERY CELL

BACKGROUND

Batteries can include electrochemical materials to supply electrical power to electrical components connected thereto. Such batteries can provide electrical energy to electrical systems.

SUMMARY

At least one aspect is directed to a solid state battery cell to power an electric vehicle. The solid state battery cell can include a first polarity terminal and a second polarity terminal. The solid state battery cell can include a housing defining a cavity. The housing can function as a current collector for the first polarity terminal. The solid state battery cell can include a membrane disposed in the cavity. The membrane can divide the cavity into a first portion and a second portion. The solid state battery cell can include an electrically conductive pin that functions as a current collector for the second polarity terminal. The solid state battery cell can include an insulator that electrically isolates the electrically conductive pin from the housing. The solid state battery cell can include a solid state anode material that is disposed in the first portion of the cavity. The solid state anode material can include solid state anode particles, first solid state electrolyte particles and a first conductive additive. The solid state anode particles can be at least partially encapsulated with the first solid state electrolyte particles. The solid state battery cell can include a solid state cathode material that is disposed in the second portion of the cavity. The solid state cathode material can include solid state cathode particles, second solid state electrolyte particles and a second conductive additive. The solid state cathode particles can be at least partially encapsulated with the second solid state electrolyte particles. The membrane can electrically isolate (or insulate) the solid state anode material from the solid state cathode material, but ionically connect the solid state anode material and the solid state cathode material.

At least one aspect is directed to a method of providing a solid state battery to power an electric vehicle. The method can include disposing a membrane in a cavity defined by a housing of the solid state battery cell to divide the cavity into a first portion and a second portion. The housing can function as a current collector for a first polarity terminal of the solid state battery cell. The method can include placing an electrically conductive pin in the second portion to function as a current collector for a second polarity terminal of the solid state battery cell. The method can include preparing an anode slurry including solid state anode particles, first solid state electrolyte particles and a first conductive additive solution. The solid state anode particles can be at least partially encapsulated with the first solid state electrolyte particles. The method can include preparing a cathode slurry including solid state cathode particles, second solid state electrolyte particles and a second conductive additive solution. The solid state cathode particles can be at least partially encapsulated with the second solid state electrolyte particles. The method can include filling the first and second portions with the anode slurry and the cathode slurry such that the anode slurry and the cathode slurry are separated by the membrane. The membrane can electrically isolate the anode slurry from the solid state cathode slurry, but ionically connect the anode slurry and the cathode slurry. The method can include placing an insulator at one end of the cavity to electrically isolate the electrically conductive pin (or the second polarity terminal) from of the housing.

At least one aspect is directed to an electric vehicle including a solid state battery to power the electric vehicle. The solid state battery cell can include a first polarity terminal and a second polarity terminal. The solid state battery cell can include a housing defining a cavity. The housing can function as a current collector for the first polarity terminal. The solid state battery cell can include a membrane disposed in the cavity. The membrane can divide the cavity into a first portion and a second portion. The solid state battery cell can include an electrically conductive pin that functions as a current collector for the second polarity terminal. The solid state battery cell can include an insulator that electrically isolates the electrically conductive pin (or the second polarity terminal) from the housing. The solid state battery cell can include a solid state anode material that is disposed in the first portion of the cavity. The solid state anode material can include solid state anode particles, first solid state electrolyte particles and a first conductive additive. The solid state anode particles can be at least partially encapsulated with the first solid state electrolyte particles. The solid state battery cell can include a solid state cathode material that is disposed in the second portion of the cavity. The solid state cathode material can include solid state cathode particles, second solid state electrolyte particles and a second conductive additive. The solid state cathode particles can be at least partially encapsulated with the second solid state electrolyte particles. The membrane can electrically isolate (or insulate) the solid state anode material from the solid state cathode material, but ionically connect the solid state anode material and the solid state cathode material.

At least one aspect is directed to method. The method can include providing a solid state battery cell. The solid state battery cell can include a first polarity terminal and a second polarity terminal. The solid state battery cell can include a housing defining a cavity. The housing can function as a current collector for the first polarity terminal. The solid state battery cell can include a membrane disposed in the cavity. The membrane can divide the cavity into a first portion and a second portion. The solid state battery cell can include an electrically conductive pin that functions as a current collector for the second polarity terminal. The solid state battery cell can include an insulator that electrically isolates the electrically conductive pin (or the second polarity terminal) from the housing. The solid state battery cell can include a solid state anode material that is disposed in the first portion of the cavity. The solid state anode material can include solid state anode particles, first solid state electrolyte particles and a first conductive additive. The solid state anode particles can be at least partially encapsulated with the first solid state electrolyte particles. The solid state battery cell can include a solid state cathode material that is disposed in the second portion of the cavity. The solid state cathode material can include solid state cathode particles, second solid state electrolyte particles and a second conductive additive. The solid state cathode particles can be at least partially encapsulated with the second solid state electrolyte particles. The membrane can electrically isolate (or insulate) the solid state anode material from the solid state cathode material, but ionically connect the solid state anode material and the solid state cathode material.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
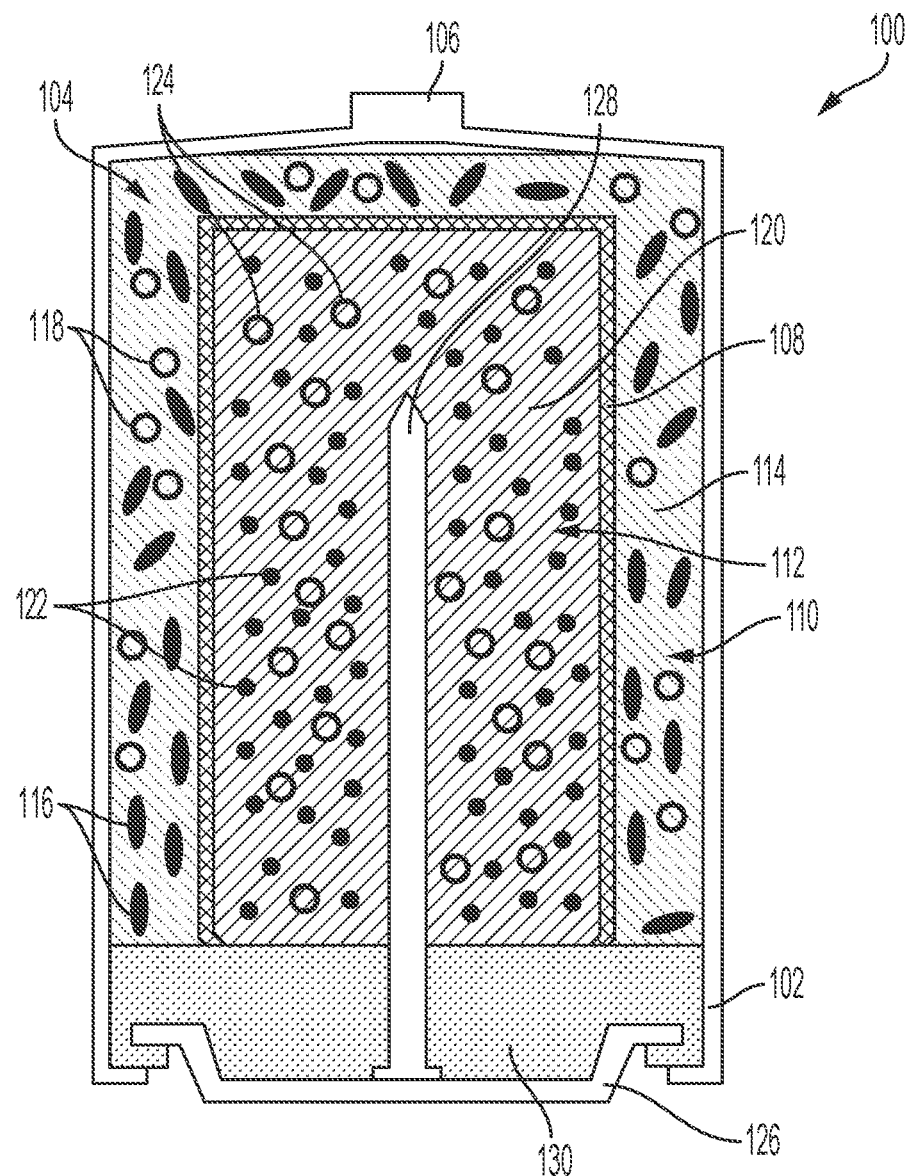
FIG. 1 shows a diagram depicting an example solid state battery cell.

Following below are more detailed descriptions of various concepts related to, and implementations of, methods, apparatuses, and systems of solid state battery cells and corresponding battery packs. The various concepts introduced above and discussed in greater detail below may be implemented in any of numerous ways.

The present disclosure is directed to systems and methods for solid state battery cells and battery packs including such solid state battery cells. The disclosed system and methods can allow for solid state battery cells and corresponding battery packs with improved electrical capacity and longer battery life. The disclosed system and methods can allow for solid state battery cells and corresponding battery packs with improved performance characteristics and ease of assembly. The battery cells and corresponding battery packs described herein can be used, or disposed, in electric vehicles, such as hybrid vehicles or electric vehicles, as well as fossil fuel or combustion based vehicles.

Vehicles, such as automobiles, can include electric batteries to generate electricity. Electric and hybrid vehicles derive power, either fully or partially, from respective battery packs. For instance, electric vehicles use electric motors instead of combustion engines and they derive all power from respective battery packs. Hybrid vehicles use a combination of a combustion engine and an electric motor, where the combustion engine typically propels the hybrid car at high speeds and the electric motor propels the hybrid car at lower speeds. For vehicles driven by a combustion engine, as well as electric and hybrid vehicles, the respective battery packs can power up electric devices of the vehicle such as vehicle lights (or lamps), media devices (e.g., radio, or media player), communication devices, or a combination thereof.

For electric and hybrid vehicles in particular, where there is more need for electric power and more reliance on the respective battery packs, the capacity and efficiency of such battery packs are important factors when it comes the maximum distance traveled with a single charge. Battery cells that include organic electrolyte can fail under out of tolerance temperature or relatively voltage conditions. A dysfunctional battery cell, including for example liquid electrolytes, can disable an electric vehicle. Solid state battery cells can use solid state electrolytes instead of electrolyte solutions. Solid state electrolytes can be less reactive than organic liquid electrolytes and can reduce spillage or leakage relative to liquid electrolyte based battery cells.

Solid state battery cells can pose various technical challenges with respect to electrical connectivity and ionic conductivity among particles within each active component and between particles of distinct active components (e.g., anodic and cathodic active components). For example, ionic conductivity between the active anodic component and the active cathodic component calls for contact between the solid state electrolyte and particles of both active components to form a continuous percolating (or percolation) solid electrolyte network for ions to traverse. A liquid electrolyte allows for maximum contact with surfaces of the active anodic and cathodic components as liquid electrolytes can completely surround these components. In the case of a solid state battery cell, the solid state electrolyte cannot suffuse itself around (or into) the cathodic and anodic active components. Also, the contact area(s) between the solid state electrolyte and each of the active components depends on the shapes and the relative placement of the solid state electrolyte and the solid state anodic and cathodic components in the battery cell. For instance, the contact area between the solid electrolyte and the solid state anodic component (or cathodic component) can be limited to a single surface area of the solid state electrolyte. The larger the contact area or contact volume between the electrolyte and each of the anodic or cathodic components (or the percolating solid electrolyte network between the active anodic and cathodic components), the higher is the battery cell capacity.

Furthermore, electrical connectivity within each of the active anodic and cathodic components of a solid state battery cell calls for a continuous electrical network in that active component to allow for electrons to travel through. The denser the electrical network within each of the active components, the more electrons can traverse that active (e.g., anodic or cathodic) component and flow into the corresponding polarity terminal. Therefore, enhancing electrical conductivity within each active (e.g., anodic or cathodic) component can lead to more electric current produced by the battery cell or higher battery capacity.

Another technical challenge is that solid state batteries can be stiff, inflexible, or more prone to disadvantageous stresses. These characteristics can lead cause cracks within any of the active anodic or cathodic components or within the solid state electrolyte. The stiffness and inflexibility can increase the likelihood of a detachment between of the solid state electrolyte from the solid state anodic component or the solid state cathodic component to create a gap in between (or along the contact area between the solid state electrolyte and any of the active anodic or cathodic components). Such cracks or gaps can lead to disconnections in the electrical or ionic conductivity pathways, and therefore, diminish the capacity of the solid state battery cell or result in failure of the battery cell.

Another technical challenge associated with solid state battery cells relates to end-of-line packaging. The stiffness and inflexibility of the various solid state components can lead to difficulty in assembling solid state battery cells. For example, stacked battery cells and pouch battery cells can be difficult to assemble because various shape and contact considerations are to be taken into account. For instance, the solid state anode, the solid state cathode and the solid state electrolyte material should be of specific shapes and dimensions to fit in the housing of the solid state battery cell in a compact way such that the solid state electrolyte is in contact with both the solid state anode and the solid state cathode. Achieving precise shapes and dimensions of these solid state materials calls for relatively complex and costly assembly (or manufacturing) processes. The complexity of the assembly process can also lead to higher rate of manufacturing or assembling errors and therefore increased cost of the solid state battery cells.

Solid state battery cells and methods of providing such battery cells (or corresponding battery packs) described herein can overcome the above described technical challenges, among others. For example, the solid state battery cells described herein can include improved electric capacities and longer battery lifetimes, for example, relative to liquid-electrolyte or other battery cells.

The solid state battery cell described herein can include two solid mixtures separated by a membrane. The solid state mixtures can include a first mixture of solid state anode particles and solid state electrolyte particles suspended in a conductive additive solution, such as carbon black, to form an anodic slurry. The anodic slurry can turn into a solid state anode material when poured in a battery cell housing. The first mixture allows for the solid state anode particles to be coated with the solid state electrolyte particles, which form a percolating solid electrolyte network between the anode particles. A second mixture can include solid state cathode particles and solid state electrolyte particles suspended in a conductive additive solution, such as carbon black, to form a cathodic slurry that is capable of turning into a solid state cathode material when poured in a battery cell housing. Similar to the first mixture, the second mixture can allow for the solid state cathode particles to be coated with the solid state electrolyte particles, which form a percolating solid electrolyte network between the cathode particles. In both mixtures, the coating can be uniform, non-uniform, complete (e.g., for all anode or cathode particles), or partial (e.g., applied to a subset of the anode or cathode particles).

The two slurries can be separated by a membrane (or a separating structure) that can act also as an ionic (or electrolyte) conductor between the solid state anode material and the solid state cathode material. As an ionic conductor, the membrane (or the separating structure) connects ionically the percolating solid electrolyte networks on both sides of the membrane. The housing of the battery cell can be in contact with, and can act as an electric current collector that collects electric current (or electrons) from, the solid state anode material or the solid state cathode material. A conductive pin can be used to collect electric current from the other active solid state material (the solid state anode material or the solid state cathode material). Both the housing and the conductive pin can be electrically coupled to respective polarity terminals of the battery cell.

The architecture of the solid state battery cells described herein allows for various technical improvements of the solid state battery cells. For instance, ions can flow freely within and between the solid electrolyte networks associated with the solid state anode material and the solid state cathode material. The encapsulation (or coating) of the solid state anode particles and the solid state cathode particles with solid state electrolyte particles can lead to enhanced connectivity between the electrolyte and each of the solid state anode and cathode particles. Also the use of conductive additive in each of the solid state anode material and the solid state cathode material can allow for enhanced connectivity between each of the solid state anode particles and the solid state cathode particles with the respective polarity terminal (or the electric circuit connected to the solid state battery cell. Further, the encapsulation of the anode and cathode particles with the electrolyte particles makes the solid state anode material and the solid state cathode material more flexible and less prone to cracking or disconnecting from the electrical and ionic conduction pathways. Finally, the assembling (or manufacturing) process of the solid state battery cells is made simpler as it does need not involve stacking or winding, but rather pouring of the anode and cathode slurries into different regions (or portions) of the battery cell housing that are separated by the membrane.

FIG. 1 depicts an example solid state battery cell 100. The solid state battery cell 100 can include at least one housing 102 that defines at least one cavity 104. The housing 102 can be made of a conductive material, such as a conductive metal (e.g., copper, lead, iron, steel, stainless steel, aluminum or a combination thereof). The housing 102 can be an electrically conductive can or container for housing various other components of the battery cell 100. The housing 102 can include an electrically insulating outer layer and an electrically conductive inner layer (none of these layers is shown in FIG. 1). For example, the housing 102 can include an electrically insulating can or container with the respective interior surface covered with an electrically conductive foil or painted with an electrically conductive paint. The electrically insulating can or container may be made of plastic. The housing 102 may include an electrically conductive can or container with the respective exterior surface at least partially covered with an electrically insulating (e.g., plastic) thin layer or painted with an electrically insulating paint. The housing 102 can have a cylindrical shape, a flat pouch-like shape, or other volumetric shape. For instance, the housing 102 can have a rectangular, square, pentagonal, hexagonal, or octagonal shaped transverse cross-sectional area.

The solid state battery cell 100 can include a first polarity terminal 106. The first polarity terminal can be electrically coupled with, or a part of, the housing 102. At least a portion of the housing 102 can operate as a current collector for the first polarity terminal 106. For example, the housing 102 (or the respective interior surface) can be in contact with either the anodic active component or the cathodic active component of the battery cell 100. Electric current can flow, through the housing 102 (or the electrically conductive portion thereof), between the active anodic component (or the active cathodic component) that is in contact with the housing 102 and the first polarity terminal 106. When the solid state battery cell 100 is in use, an electric wire (not shown in FIG. 1) may connect the first polarity terminal 106 to an electric circuit or other component powered by the solid state battery cell 100.

The solid state battery cell 100 can include a membrane or partitioning structure, 108 disposed in the cavity 104. The membrane 108 can divide (or partition) the cavity 104 into a first portion (or a first volumetric region) 110 and a second portion (or a second volumetric region) 112. The membrane (or partitioning structure) 108 can be made of a thin material, such as a thin polymer. For instance, the membrane (or partitioning structure) 108 can be one or between one and six millimeters thick. The membrane (or partitioning structure) 108 can also be less than one millimeter thick (e.g., a polymer film). The membrane 108 can have a pouch-like shape, a cylindrical shape, or other volumetric shape that defines a boundary of the second portion (or the second volumetric region) 112. For example, the membrane 108 can include a polymer pouch. The membrane 108 (or the respective thin material) can be porous to allow for ions to penetrate (or traverse) through. For instance, the membrane 108 can be made of a porous polymer. Ions can traverse the membrane 108 through respective pores, which makes the membrane ionically conductive. The membrane (or partitioning structure) 108 can be impregnated with third solid state electrolyte particles, for example, to enhance ionic conductivity of the membrane 108. For example, pores in the membrane (or partitioning structure) 108 can accommodate solid state electrolyte particles. The third solid state electrolyte particles can include, for example, particles (or powder) of sulfide-based solid electrolytes (e.g., lithium tin phosphorous sulfide), polymer-based solid electrolytes (e.g., SE-50 or H-Polymer), or other solid electrolytes. The third solid state electrolyte particles can be similar to the first or second electrolyte particles.

The membrane (or partitioning structure) 108 can include a microporous polymer membrane (or microporous polymer pouch), for example, made of semi-crystalline polyolefin materials, such as polyethylene (PE), polypropylene (PP) or a combination thereof. To impregnate the microporous polymer membrane with the third electrolyte particles, the microporous polymer membrane can be suspended in an electrolyte solution. The electrolyte solution can include the third electrolyte particles with particle sizes, for example, in the micron range or nano range. The electrolyte particles can penetrate into pores of the membrane 108. The impregnation process can include evaporating the solvent of the electrolyte solution. While the membrane (or partitioning structure) 108 can be or can include a polymer membrane, the membrane (or partitioning structure) 108 can also include other types of ion-conducting membranes, such as ceramic ion conducting membranes. The membrane (or partitioning structure) 108 can be made of a flexible or elastic material. Flexibility or elasticity reduces the likelihood of the membrane (or partitioning structure) 108 cracking, for example, under pressure exerted by one or more other components of the solid state battery cell 100. For example, the membrane 108 can be or include a flexible polymer pouch capable of forming the second volumetric region 112 when filled with the solid state cathode material 120 (or when filled with the solid state anode material 114 as described below with regard to FIG. 2).

The solid state battery cell 100 can include a solid state anode material 114 that can be disposed in the first portion (or first volumetric region) 110 of the cavity 104. The solid state anode material 114 can include a mixture of solid state anode particles 116, first solid state electrolyte particles 118 and a first conductive additive. The solid state anode particles 116 can include, for example, particles (or powder) of lithium metal, zinc, aluminum, magnesium, graphite or a combination thereof. The first solid state electrolyte particles 118 can include, for example, particles (or powder) of sulfide-based solid electrolytes (e.g., lithium tin phosphorous sulfide), polymer-based solid electrolytes (e.g., SE-50 or H-Polymer), or other solid electrolytes. The first conductive additive can include carbon black, carbon fiber, stainless steel fiber, nickel-coated graphite, or a combination thereof, among others. The solid state anode particles 116 and the first solid state electrolyte particles 118 can be suspended in a solution of the first conductive additive to form an anode slurry. The anode slurry can be disposed (or poured) in the first portion 110 to form the solid state anode material 114. For instance, the solvent of the first conductive additive solution can evaporate under relatively elevated temperature allowing the anode slurry to turn into the solid state anode material 114.

Mixing the solid state anode particles 116 with the first solid state electrolyte particles 118 can include encapsulating (or coating) the solid state anode particles 116 with the first electrolyte particles 118, and can form a percolating (or percolation) solid electrolyte network within the solid state anode material 114. The encapsulation of solid state anode particles 116 with the first solid state electrolyte particles 118 can allow for expanded volume of contact between the solid state anode particles 116 and the first solid state electrolyte particles 118. For instance, in a solid state battery cell where a solid state electrolyte component is stacked adjacent to a solid state anode component, the contact between the electrolyte and the anode component can be restricted to the area of sides of both components that in contact with each other. However, in the solid state battery cell 100, contact between the solid state anode particles 116 and the first solid state electrolyte particles 118 can take place throughout the volume of the solid state anode material 114 (or the volumetric region 110). Specifically, the percolating (or percolation) solid electrolyte network can spread throughout the solid state anode material 114.

The wider (or larger) is the contact region or volume between the solid state anode particles 116 and the first solid state electrolyte particles 118, the more oxidation reactions can take place leading to more electrons being released within the solid state anode material 114. The first conductive additive can act as an electric network allowing for electrons to traverse the solid state anode material 114 and flow into the housing (or the conductive portion thereof). Also, the percolating (or percolation) solid electrolyte network can provide ionic conduction pathways for ions to move across the solid state anode material 114, for example, towards (or from) the membrane 108.

The solid state battery cell 100 can include a solid state cathode material 120 that can be disposed in the second portion (or volumetric region) 112 of the cavity 104. The solid state cathode material 120 can include a mixture of solid state cathode particles 122, second solid state electrolyte particles 124 and a second conductive additive. The solid state cathode particles 122 can include, for example, particles (or powder) of nickel-cobalt-manganese (NCM) oxide, nickel-cobalt-aluminum (NCA) oxide, lithium-manganese oxide (LMO), lithium-manganese-spinel materials, and lithium-nickel-manganese-Spinel materials or a combination thereof. Similar to the first solid state electrolyte particles 118, the second solid state electrolyte particles 124 can include, for example, particles (or powder) of sulfide-based solid electrolytes (e.g., lithium tin phosphorous sulfide), polymer-based solid electrolytes (e.g., SE-50 or H-Polymer), or other solid electrolytes. The same type of solid state electrolyte particles (or powder) can be used for both the first solid state electrolyte particles 118 used in the solid state anode material 114 and the second solid state electrolyte particles 124 used in the solid state cathode material 120. Also, the second conductive additive solution may be similar to the first conductive additive used in the solid state anode material 114, and can include carbon black, carbon fiber, stainless steel fiber, nickel-coated graphite, or a combination thereof, among others. The solid state cathode particles 122 and the second solid state electrolyte particles 124 can be suspended in a solution of the second conductive additive to form a cathode slurry. The cathode slurry can be disposed (or poured) in the second portion (or volumetric region) 112 to form the solid state cathode material 120. For instance, upon evaporation of the solvent of the second conductive additive solution, the cathode slurry can turn into the solid state cathode material 120.

The mixing of the solid state cathode particles 122 with the second solid state electrolyte particles 124 can include encapsulating (or coating) the solid state cathode particles 122 with the second solid state electrolyte particles 124, and can lead to forming a percolating (or percolation) solid electrolyte network within the solid state cathode material 120. The percolating (or percolation) solid electrolyte network can spread throughout the solid state cathode material 120 forming distributed volumes (or areas) of contact between the solid state cathode particles 122 and the second solid state electrolyte particles 124. The distributed volumes (or areas) of contact between the solid state cathode particles 122 and the second solid state electrolyte particles 124 can lead to increased reduction reactions and more electrons being attracted or detained within the solid state cathode material 120. The second conductive additive can act as an electric network for electrons to move freely within the solid state cathode material 120 and flow into the housing (or the conductive portion thereof). Also, the percolating (or percolation) solid electrolyte network can provide ionic conduction pathways for ions to move across the solid state cathode material 120, for example, towards (or from) the membrane 108.

The solid state battery cell 100 can include a second polarity terminal 126 and an electrically conductive pin 128 that can operate as a current collector for the second polarity terminal 126. The electrically conductive pin 128 can be disposed in the second portion (or second volumetric region) 112. The electrically conductive pin 128 can be immersed in the cathode solid state material 120. For instance, the electrically conductive pin 128 can be placed within the second portion (or second volumetric region) 112 before or after pouring the cathode slurry in the second portion 112. Electrons can flow through the electrically conductive pin 128 and into the solid state cathode material 120. The electrically conductive pin 128 can be made of a conductive metal, such as stainless steel, iron, copper, aluminum, lead or a combination thereof. The electrically conductive pin 128 can be electrically coupled to the second polarity terminal 126.

The second polarity terminal 126 can be made of a conductive metal, such as stainless steel, iron, copper, aluminum, lead or a combination thereof. While FIG. 1 shows the second polarity terminal 126 as a separate element that is electrically coupled to the electrically conductive pin 128, a portion (e.g., a flat end) of the electrically conductive pin 128 can act as the second polarity terminal 126. The second polarity terminal 126 and the electrically conductive pin 128 can be separate elements that are welded together. The second polarity terminal 126 can be electrically coupled (e.g., through electric wires) with the electric circuit powered by the solid state battery cell 100 when the solid state battery cell is in use, for example. The electrically conductive pin 128 can have a length that is equal to about (e.g., 0.8 to 1.1) the depth of the membrane 108. The length of the portion of the electrically conductive pin 128 arranged within the membrane 108 can be equal to, for example, 0.7 to 0.9 the depth of the membrane 108. As such, the tip (or ending) of the electrically conductive pin 128 can be away from (e.g., not in contact with) the membrane to avoid tearing the membrane 108. The electrically conductive pin 128 can have a sharp (or pointing) ending, a rounded ending or a flat ending, among others.

The membrane (or partitioning structure) 108 can act as an electrically insulating separator between the solid state anode material 114 and the solid state cathode material 120 preventing electrons from passing across. That is, the membrane (or partitioning structure) 108 can electrically isolate (or insulate) the solid state anode material 114 from the solid state cathode material 120. At the same time, the membrane 108 can also act as an ionic conductor, and can ionically connect the percolating (or percolation) solid electrolyte network within the solid state anode material 114 to the percolating (or percolation) solid electrolyte network within the solid state cathode material 120. That is, the membrane (or partitioning structure) 108 can ionically connect the solid state anode material 114 and the solid state cathode material 120. For example, when the solid state battery cell 100 is in use, electrons released as part of the oxidation reactions taking place within the solid state anode material 114 can propagate within the solid state anode material 114 and flow into the housing 102. The electrons can flow from the housing 102 into the first polarity terminal 106 and then into the electric circuit (not shown in FIG. 1) connected to the sold state battery cell 100. The electrons can flow from the electric circuit to the second polarity terminal 126 and then into electrically conductive pin 128. The electrons can then propagate into the solid state cathode material 120 where they are consumed by the reduction reactions. The ions generated by the reduction reactions within the solid state cathode material 120 and the ions generated by the oxidation reactions within the solid state anode material 114 can propagate through the membrane 108 into the opposite sides. Electric current propagates in opposite direction compared to the electrons. That is, the electric current can flow from the solid state cathode material 120 through the electrically conductive pin 128 and the second polarity terminal 126 towards the electric circuit. From the electric circuit, the electric current can flow through the first polarity terminal 106 and the housing 102 into the sloid state anode material 114.

The solid state battery cell 100 can include an insulator (or electrically insulating material) 130 that can electrically isolate the electrically conductive pin 128 from the housing 102. The insulator 130 may also electrically isolate the housing 102 from the second polarity terminal 126. The insulator 130 can be made of rubber, plastic or other insulating material or combinations thereof. The insulator 130 can be placed (or disposed) at an open end of the housing 102. The insulator 130 can act as a protective cap at the open end of the housing 102. The electrically conductive pin 128 can be arranged to penetrate through the insulator 130 to electrically couple the solid state cathode material 120 with the second polarity terminal 126. The insulator 130 can also hold the electrically conductive pin 128 in a fixed position.

The solid state battery cell 100 be, or include shape and dimensions of, a 21700 battery cell, a 20700 battery cell, a 17500 battery cell, a 17670 battery cell, a 18350 battery cell, a 18500 battery cell, among others. The 21700 battery cell has a cylindrical shape with a diameter of 21 millimeters (mm) and a length of 70 mm. The 21700 battery cell has a cylindrical shape with a diameter of 20 mm and a length of 70 mm. The 17500 battery cell has a cylindrical shape with a diameter of 17 mm and a length of 50 mm. The 17670 battery cell has a cylindrical shape with a diameter of 17 mm and a length of 67 mm. The 18350 battery cell has a cylindrical shape with a diameter of 18 mm and a length of 35 mm. The 18500 battery cell has a cylindrical shape with a diameter of 18 mm and a length of 50 mm. These dimensions provided for the 21700, 20700, 17500, 17670, 18350 and 18500 battery cells, among others, can be within a tolerance range, for example, of plus or minus 1 mm.

Figure 2:
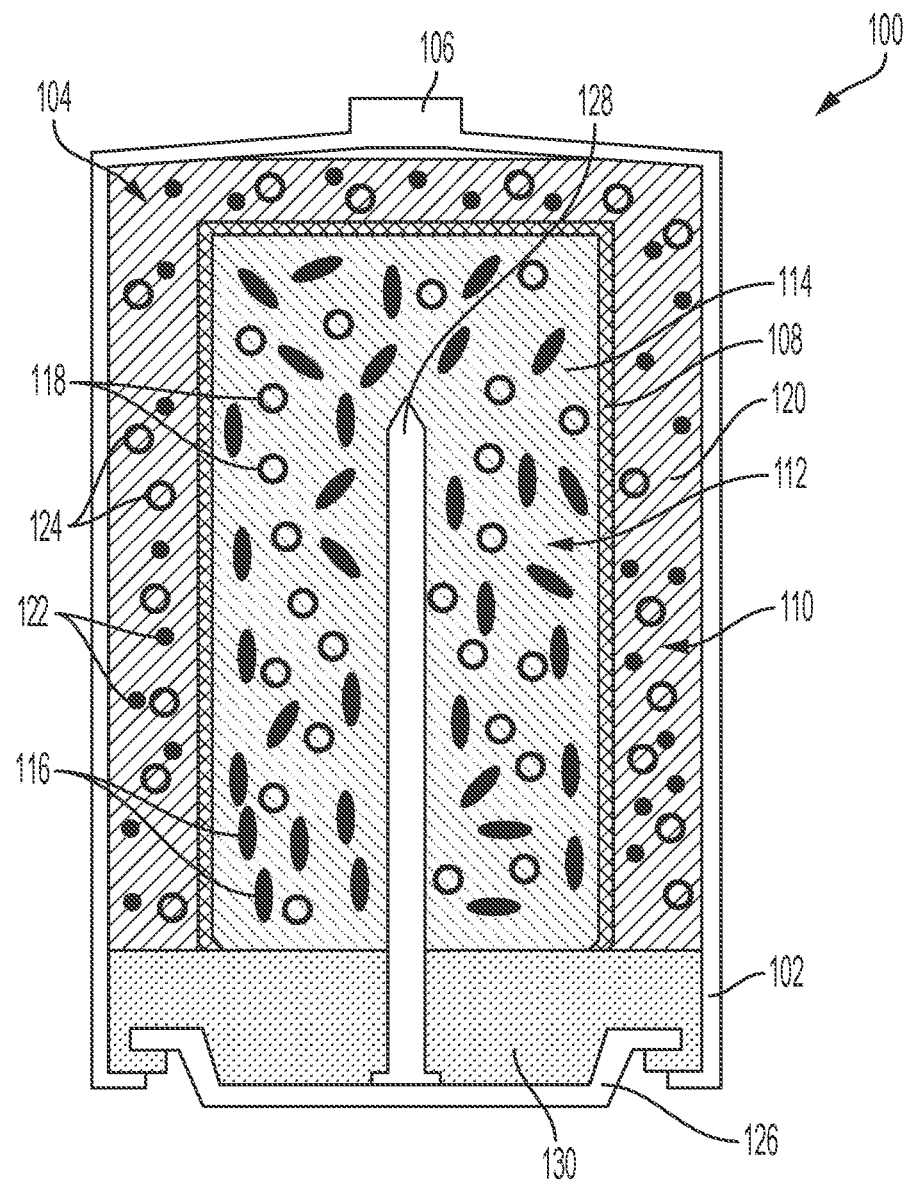
FIG. 2 shows a diagram depicting another example solid state battery cell.

FIG. 2 depicts another example solid state battery cell 100. The solid state battery cell 100 can include various placement (or arrangement) of the solid state anode material 114 and the solid state cathode material 120 in the cavity 104. For example, the solid state cathode material 120 can be disposed in the first portion 110 of the cavity 104 and the solid state anode material 114 can disposed in the second portion 112 of the cavity. As such, the solid state cathode material 120 can be arranged in contact with housing 102, whereas the electrically conductive pin 128 can be immersed in the solid state anode material 114. The polarities of the first and second polarity terminals 106 and 126 can be reversed with respect to the solid state battery cell 100 of FIG. 1. For instance, in FIG. 1, the first polarity terminal 106 can act as the negative terminal of the solid state battery cell 100 and the second polarity terminal 126 can act as the positive terminal. In the example of FIG. 2, the first polarity terminal 106 acts as the positive terminal and the second polarity terminal 126 acts as the negative terminal.

In the solid state battery cell 100, the first volumetric region 110 (or the second volumetric region 112) can have other shapes depending, for example, on the shape of the housing 102 or the shape of the membrane 108. For example, the second volumetric region 112 can have an ellipsoidal shape, a spherical shape, or other three-dimensional (or volumetric) shape. Also, the first polarity terminal 106, the second polarity terminal 126 and the electrically conductive pin 128 can take different other shapes, for example, compared to those illustrated in FIGS. 1 and 2.

Figure 3:
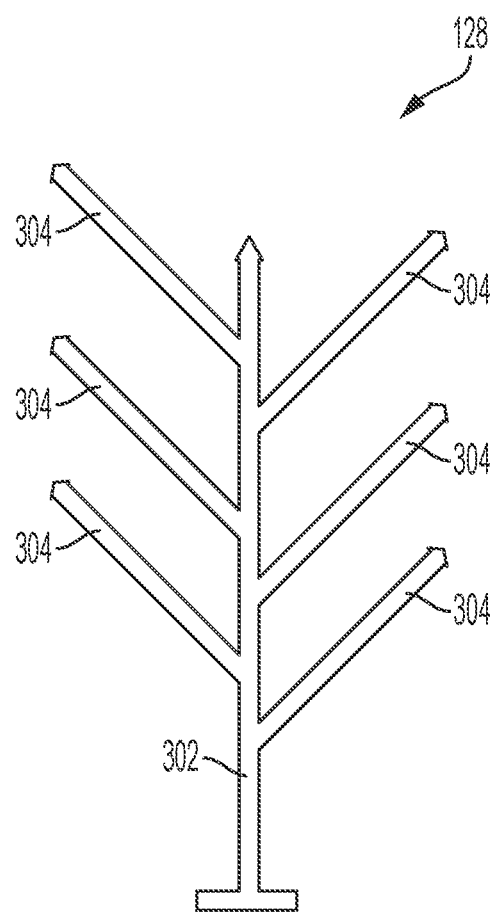
FIG. 3 shows a diagram depicting an example multi-branch conductive pin.

FIG. 3 depicts an electrically conductive pin 128 having a multi-branch structure. The conductive pin 128 can be part of the battery cell 100, for example. The electrically conductive pin 128 can include a primary branch 302 and at least one secondary branch 304. The primary branch 302 and the secondary branches 304 can be integrally formed or welded together, for example, using ultrasonic welding. The primary branch 302 and one or more secondary branches 304 can be arranged or oriented, according to various three-dimensional directions with respect to each other. For example, the secondary branches 403 can be uniformly distributed, or distributed according to a symmetrical or asymmetrical pattern. The multi-branch electrically conductive pin 128 can be used solid state battery cell 100 described with regard to FIGS. 1 and 2. The branches 302 and 304 of the multi-branch electrically conductive pin 128 can allow for increased contact surface (or volumetrically distributed contact) between the electrically conductive pin 128 and the solid state active (either anode or cathode) materials (or particles) disposed in the second portion 112, relative to a pin with fewer branches or less surface area. The increase in contact areas between the solid state active material in the second portion 112 and the electrically conductive pin 128 can increase the amount of electrons flowing between the solid state active material and the electrically conductive pin 128.

The primary branch 302 and/or the secondary branches 304 can have sharp (or pointing) endings, rounded endings or flat endings, among others. The primary branch 302 can have a length about that is equal to about (e.g., 0.8 to 1.1) the depth of the membrane 108. The length of the portion of the primary branch 302 arranged within the membrane 108 can be equal to, for example, 0.7 to 0.9 the depth of the membrane 108. The secondary branches 304 can have respective lengths ranging, for example, between 0.5 to 0.95 the radius of the membrane's cross-sectional area. The secondary branches 304 can be arranged at angles ranging from, for example, 30 degrees to 90 degrees from the primary branch. The dimensions of the primary branch 302 and the secondary branches 304 and their relative arrangements (or geometry) can be selected or designed so that none of the endings of the branches come in contact with the membrane to avoid tearing the membrane 108.

The electrically conductive pin 128 can have other shapes or forms that allow for increased contact areas (or contact volumes) with the solid state active (e.g., anode or cathode) material disposed in the second volumetric region 112 of the solid state battery cell 100. For example, the electrically conductive pin 128 can have another tree-like shape (e.g., different than the shape of the multi-branch electrically conductive pin 300 shown in FIG. 3). The conductive pin 128 may include a plurality of thin conductive metal sheets (e.g., instead of branches) that are welded together and, for example, arranged transverse to each other.

Figure 4:
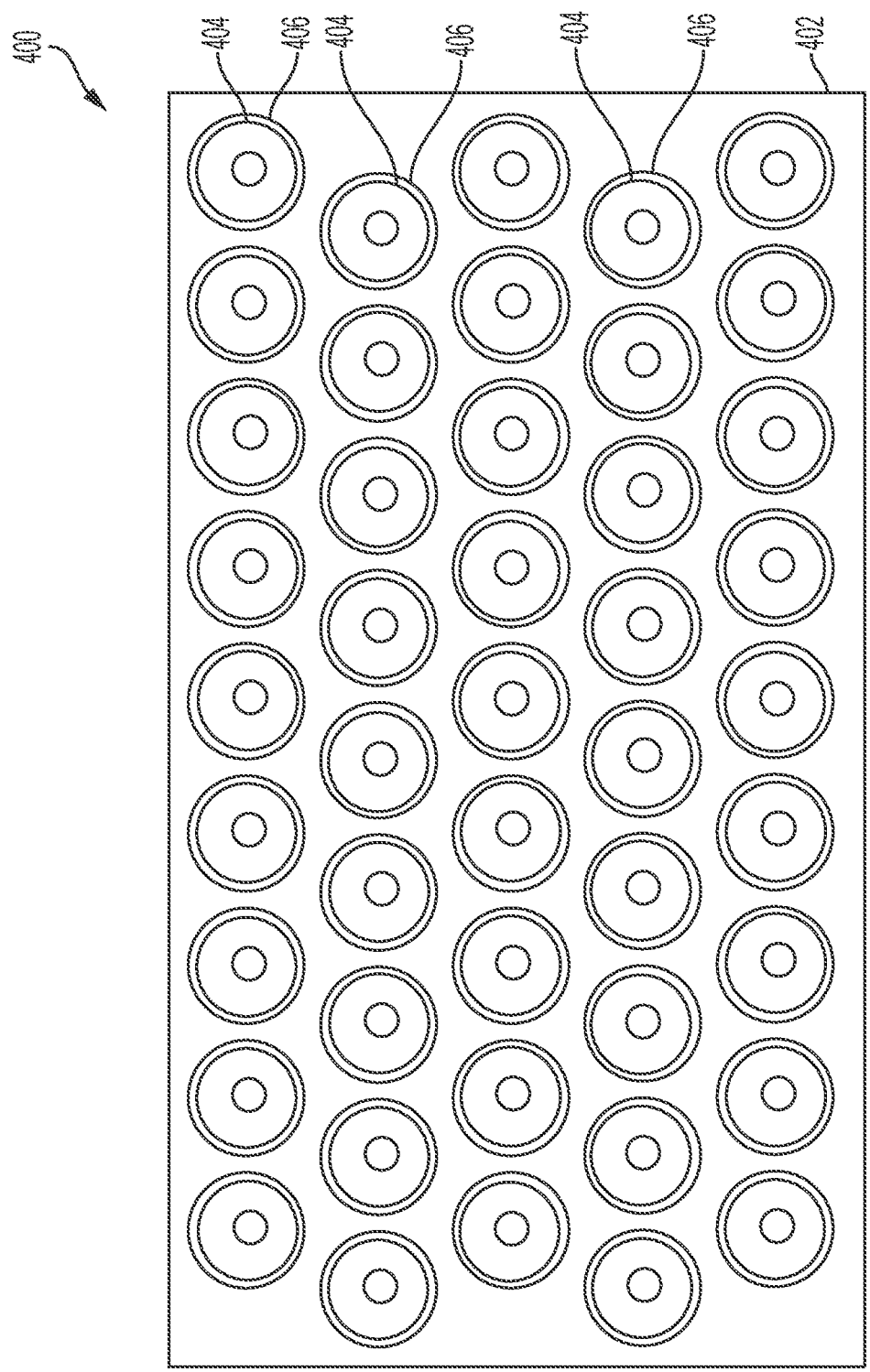
FIG. 4 shows a diagram depicting an example battery pack.

FIG. 4 is a diagram depicting a top-down view of a battery pack 400. The battery pack 400 can include a casing 402 to enclose or house a plurality of solid state battery cells 404. The solid state battery cells 404 can include solid state battery cells 100. The battery pack 400 can define or include a set of holders 406. The shape of each holder 406 can match a shape of the housing 102 of the solid state battery cells 100. For instance, the shape of each holder 406 can be cylindrical with a circular (e.g., as depicted), elliptical, or ovular transverse cross-sectional area, among others. The shape of each holder 406 can also be prismatic with a polygonal transverse cross-sectional area, such as a triangle, a square, a rectangle, a pentagon, a hexagon or an octagon, among others. The shapes of each holder 406 can vary or can be uniform throughout the battery pack 400. For example, some holders 406 can be hexagonal in shape, whereas other holders 406 can be circular in shape. The dimensions of each holder 406 can be larger than the dimensions of the battery cell 404 housed therein. Each holder 406 can have a shape and dimensions to accommodate battery cells 404 that are similar in shape and dimensions as those of 21700 battery cells, 20700 battery cells, 17500 battery cells, 17670 battery cells, 18350 battery cells, 18500 battery cells among others. For example, each holder 406 can have a length ranging between 10 mm to 300 mm. Each holder 406 can have a width ranging between 10 mm to 300 mm. Each holder 406 can have a height (or depth) ranging between 65 mm to 100 cm.

The holders 406 can be part of the casing 402. The holders 406 can be part of a structure separate from the casing, but that can be designed to firmly fit within the casing 402. The casing 402 or the holders 406 can be made of an electrically insulating material such as polymer. The casing 402 or the holders 406 can be made of a polymer with relatively high mechanical strength to provide sufficient mechanical support to keep the battery cells 404 from breaking apart. The battery cells 404 can be electrically connected together, for example, through electric wires (not shown in FIG. 4). The battery cells 404 can be electrically connected in series, in parallel, or according to a combination of series and parallel connections.

Figure 5:
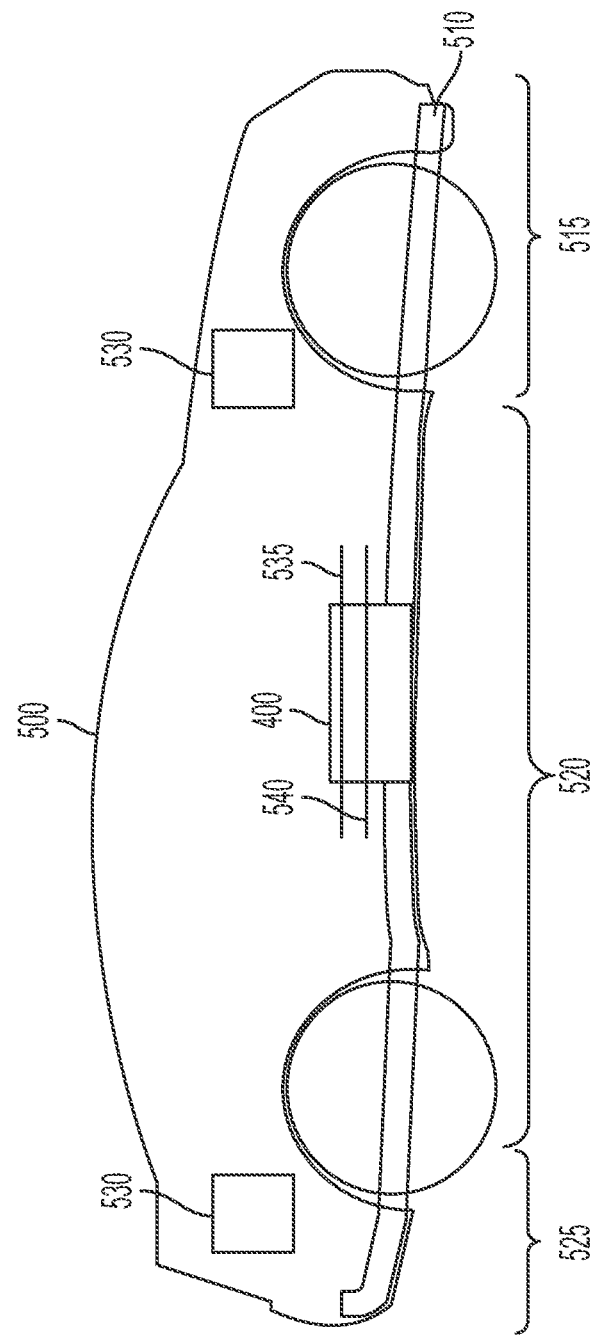
FIG. 5 shows a diagram depicting an example electric vehicle.

FIG. 5 is a diagram depicting a cross-sectional view of an electric vehicle 500. The electric vehicle 500 can be a fully-electric vehicle or a hybrid vehicle. The electric vehicle 500 can be an automobile (e.g., as depicted in FIG. 5), a scooter, a passenger vehicle, sport utility vehicle, a passenger or commercial truck, and another type of vehicle such as sea or air transport vehicles, a plane, a helicopter, a submarine, a boat, or a drone, among others. The electric vehicle 500 can include at least one chassis 510 (e.g., a frame, internal frame, or support structure). The chassis 510 can support various components of the electric vehicle 500. The chassis 510 can span a front portion 515 (e.g., a hood or bonnet portion), a body portion 520, and a rear portion 525 (e.g., a trunk portion) of the electric vehicle 500. The battery pack 505 can be installed or placed within the electric vehicle 500. The battery pack 505 can be installed on the chassis 510 of the electric vehicle 500 within the front portion 515, the body portion 520 (as depicted in FIG. 5), or the rear portion 525.

The electric vehicle 500 can include at least one battery pack 400. As discussed with regard to FIG. 4, the battery pack 400 can house, contain, or otherwise include a set of one or more battery cells 404, among other components. The set of battery cells 404 can include one or more solid state battery cells 100. The number of battery cells 404 in the battery pack 400 can vary, for example, based on the desired cumulative electrical characteristics (e.g., output voltage, output electric, electric power or a combination thereof) of the battery pack 400. The battery pack 400 can be of various shapes. The shape of battery pack 400 can be cylindrical with a circular, elliptical, or ovular transverse cross-sectional area, among others. The shape of battery pack 400 can also be prismatic with a polygonal cross-sectional area, such as a triangle, a square, a rectangle (e.g., as depicted in FIG. 4), a pentagon, and a hexagon, among others. The dimensions of the battery pack 400 can vary, for example, based on the size and number of battery cells 404 enclosed in the battery pack 400.

The electric vehicle 500 can include one or more electric (or electronic) components 530 that can be electrically coupled to the battery pack 400. The one or more electric (or electronic) components 530 can include an electric engine, an entertainment system (e.g., a radio, display screen, and sound system), on-board diagnostics system, and electric control units (ECUs) (e.g., an engine control module, a transmission control module, a brake control module, and a body control module), among others. The one or more electric (or electronic) components 530 can be installed in the front portion 515, the body portion 520, or the rear portion 525 of the electric vehicle 50. The battery pack 400 installed in the electric vehicle 500 can provide electrical power to the one or more components 530 via at least one positive current collector 535 and at least one negative current collector 540. The positive current collector 535 and the negative current collector 540 can be connected or otherwise be electrically coupled to other electrical components of the electric vehicle 500 to provide electrical power. The positive current collector 535 (e.g., a positive busbar) can be connected or otherwise electrically coupled with each positive current collector 535 of each battery module 305 in the battery pack 505.

Figure 6:
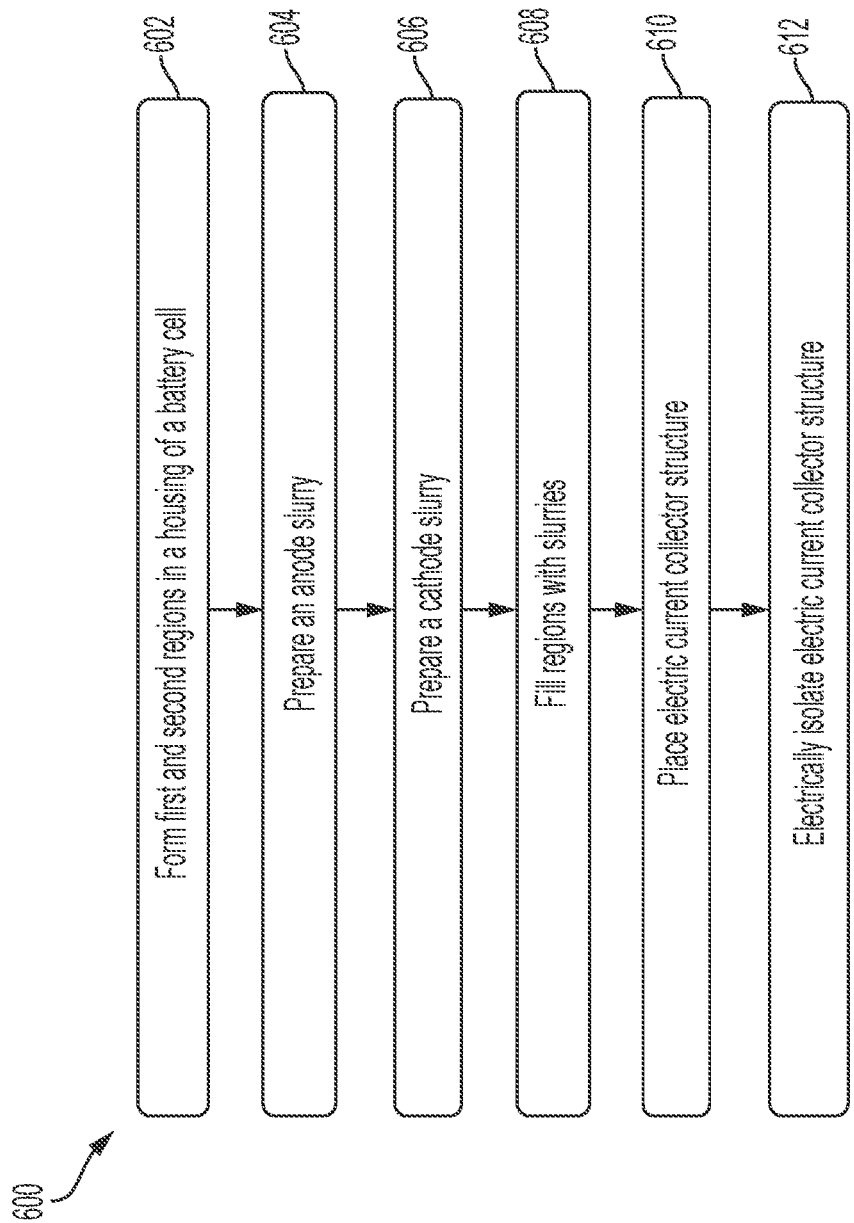
FIG. 6 shows a flow diagram depicting an example method of providing solid state battery cells.

FIG. 6 shows a flow diagram depicting an example method 600 of providing solid state battery cells (e.g., battery cells 100). The method 600 can include forming first and second regions in a housing of a battery cell (ACT 602). The method 600 can include preparing an anode slurry (ACT 604), and preparing a cathode slurry (ACT 606). The method 600 can include filling the first and second regions with the anode slurry and the cathode slurry (ACT 608). The method 600 can include placing an electric current collector structure (ACT 610). The method 600 can include electrically isolating the electric current collector structure (ACT 612).

The method 600 can include forming first and second regions in a housing of a battery cell (ACT 602). The housing of the battery cell can define a cavity as described with respect to housing 102 of FIGS. 1 and 2. The method 600 can include using a separator to form the first and second regions. The separator can include a membrane or membrane pouch, such as membrane 108. When placed in the housing of the battery cell, the separator can divide the cavity of the battery cell into a first volumetric region and a second volumetric region. The separator, as discussed with respect to the membrane 108 of FIGS. 1 and 2, can electrically isolate (or insulate) the first and second volumetric regions (or materials therein), while ionically connecting the two regions (or materials therein). In general, the separator can include the membrane (or partitioning structure) discussed with respect to FIGS. 1 and 2. The separator (e.g., as a membrane pouch) may not have a definite shape but can take different shapes based on, for example, how it is filled or pressure exerted by its surrounding. The separator (e.g., as a membrane pouch) may have an opening that allows filling the separator with a material, and that is capable of being closed, tied or sealed to prevent the release of the material.

The method 600 can include impregnating a polymer membrane with electrolyte particles. The polymer membrane can be a porous (e.g., microporous) polymer membrane (or polymer pouch), for example, made of semi-crystalline polyolefin materials, such as polyethylene (PE), polypropylene (PP) or a combination thereof. Impregnating the porous polymer membrane with electrolyte particles can include suspending the porous polymer membrane in an electrolyte solution. The electrolyte solution may include electrolyte particles with particle sizes, for example, in the micron range or nano range. The impregnation process may include evaporating the solvent of the electrolyte solution. In some implementations, the separator may include other types of ion-conducting membranes, such as ceramic ion conducting membranes.

The method 600 can include preparing an anode slurry (ACT 604). Preparing the anode slurry can include suspending solid state anode particles and first solid state electrolyte particles in a first conductive additive solution. The solid state anode particles can include, for example, particles (or powder) of lithium metal, zinc, aluminum, magnesium, graphite or a combination thereof. The first solid state electrolyte particles can include, for example, particles (or powder) of sulfide-based solid electrolytes (e.g., lithium tin phosphorous sulfide), polymer-based solid electrolytes (e.g., SE-50 or H-Polymer), or other solid electrolytes. The first conductive additive solution can include a solution of carbon black, carbon fiber, stainless steel fiber, nickel-coated graphite, or a combination thereof. Preparing the anode slurry can include mixing the solid state anode particles and the first solid state electrolyte particles, and then suspending the mixture in the first conductive additive solution.

As discussed with respect to FIGS. 1 and 2, using both the solid state anode particles and the first solid state electrolyte particles to prepare the anode slurry allows for encapsulating (or coating) the solid state anode particles with the first electrolyte particles, and forming a percolating (or percolation) solid electrolyte network within the anode slurry or any solid state anode material formed using the anode slurry. The encapsulation of solid state anode particles with the first solid state electrolyte particles allows for distributed volumes (or areas) of contact between the solid state anode particles and the first solid state electrolyte particles defined by the percolating (or percolation) solid electrolyte network.

The method 600 can include preparing a cathode slurry (ACT 608). Preparing the cathode slurry can include suspending solid state cathode particles and second solid state electrolyte particles in a second conductive additive solution. The second solid state cathode particles can include, for example, particles (or powder) of nickel-cobalt-manganese (NCM) oxide, nickel-cobalt-aluminum (NCA) oxide, lithium-manganese oxide (LMO), lithium-manganese-spinel materials, and lithium-nickel-manganese-Spinel materials or a combination thereof. Similar to first solid state electrolyte particles, the second solid state electrolyte particles can include, for example, particles (or powder) of sulfide-based solid electrolytes (e.g., lithium tin phosphorous sulfide), polymer-based solid electrolytes (e.g., SE-50 or H-Polymer), or other solid electrolytes. The same type of solid state of electrolyte particles can be used for the first and second solid state electrolyte particles. Also, the second conductive additive solution can be similar to the first conductive additive solution used in preparing the solid state anode slurry, and can include a solution of carbon black, carbon fiber, stainless steel fiber, nickel-coated graphite, or a combination thereof. Preparing the cathode slurry can include mixing the solid state cathode particles and the second solid state electrolyte particles, and then suspending the mixture in the second conductive additive solution.

Similar to the anode slurry, using both the solid state cathode particles and the second solid state electrolyte particles to prepare the cathode slurry allows for encapsulating (or coating) the solid state cathode particles with the second electrolyte particles, and forming a percolating (or percolation) solid electrolyte network within the cathode slurry or any solid state cathode material formed using the cathode slurry. The encapsulation of solid state cathode particles with the solid state electrolyte particles allows for distributed volumes (or areas) of contact between the solid state cathode particles and the second solid state electrolyte particles defined by the percolating (or percolation) solid electrolyte network.

The method 600 can include filling the first and second regions with the anode slurry and the cathode slurry (ACT 608). The method 600 can include either pouring the anode slurry in the first volumetric region and pouring the cathode slurry in the second volumetric region as illustrated by FIG. 1, or pouring the cathode slurry in the first volumetric region and pouring the anode slurry in the second volumetric region as illustrated by FIG. 2. In either case, the anode and cathode slurries are separated by the separator (or membrane) when poured in the first and second regions. The separator (or membrane) can electrically isolate (or insulate) the first volumetric region (or any material therein) from the second volumetric region (or any material therein), while ionically connecting both regions (or any materials therein). Also, the housing of the battery cell can be in contact with the slurry poured in the first volumetric region. The housing of the battery cell can be electrically coupled to a first polarity terminal of the battery cell. The housing of the battery cell can act as an electric current collector that electrically couples the slurry poured in the first region (or a respective solid state active material) to the first polarity terminal.

The method 600 can include placing an electric current collector structure (ACT 610). For instance, the method 600 can include placing the electric current collector structure in the second region of the housing, for example, defined by the separator (e.g., polymer pouch or other type of separator). A portion of the electric current collector structure may extend beyond the interior of the separator to be electrically coupled with a second polarity terminal. The electric current collector structure can include conductive pin 128 of FIGS. 1 and 2, conductive pin 300 of FIG. 300, other conductive pins (or) described with respect to FIGS. 1-3, among others.

The method 600 can include turning the anode slurry into a solid state slurry and turning the cathode slurry into a solid state cathode material, for example, by evaporating solvents in both slurries. For instance, the method can include applying heat or elevated temperature to both slurries poured in the housing of the battery cell to evaporate the respective solvents. The housing of the battery cell can act as an electric current collector that electrically couples the solid state active (e.g., anode or cathode) material placed in the first volumetric region to a first polarity terminal of the battery cell. The first polarity terminal can be part of the housing or a separate conductive element (or structure) that is electrically coupled to the housing. The method 600 may further include welding (or electrically or mechanically) coupling the first polarity terminal to the housing of the battery cell.

The method 600 can include electrically isolating the electric current collector structure placed in the second region (ACT 612). The method 600 can include electrically isolating the electric current collector structure (or the second polarity terminal) from the housing. Electrically isolating the housing from the electric current collector structure (or the second polarity terminal) can include placing an insulator (such as insulator 130 of FIGS. 1 and 2) at an open end of the housing in a way to electrically isolate the housing from the electric current collector structure. The electric current collector structure can be electrically coupled to a second polarity terminal of the battery cell. The second polarity terminal of the battery cell can be a portion of the electric current collector structure or a separate conductive element (or structure) that is electrically coupled to the electric current collector structure. The method 600 may further include welding (or mechanically or electrically coupling) the second polarity terminal with the electric current collector structure.

Placing the insulator 130 at an open end of the housing can include passing a portion of the electric current collector structure through the insulator. The method 600 may also include sealing the separator (e.g., polymer pouch) to prevent release or escape of the solid state active material (or respective slurry) housed by the separator, or to maintain the separation between the solid state anode material and the solid state cathode material. The method 600 can include welding (e.g., ultrasonic welding) various conductive elements to form a multi-branch conductive pin (e.g., multi-branch conductive pin 300). The method 600 can include assembling a battery pack (e.g., battery pack 400) that includes one or more solid state battery cells provided according to method 600, for example, for use in an electric vehicle (e.g., electric vehicle 500).

The acts described with regard to method 600 can be performed according to various orders. For example, the electric current collector structure can be placed in the separator before pouring the one of the slurries (anode slurry or cathode slurry) in the separator. The placing of the separator in the housing may be performed after pouring one of the slurries in the separator. Preparing the anode slurry (or the cathode slurry) may be performed by pouring the corresponding conductive additive solution in either the first region or the second region and suspending the solid state anode (or cathode) particles and the solid state electrolyte particles in the conductive additive solution. As such, steps 604 and 608 (or 606 and 608) may be combined into a respective single step. Other orderings of the steps of method 600 are contemplated by the current disclosure.

Characteristics of components of the solid state battery cells and the solid state battery cells described with respect to FIGS. 1-5 also apply to corresponding components of the battery cell and the battery cell provided by method 600. Also, the battery cells described with regard to FIGS. 1-3 can be assembled or manufactured using method 600.

Figure 7:
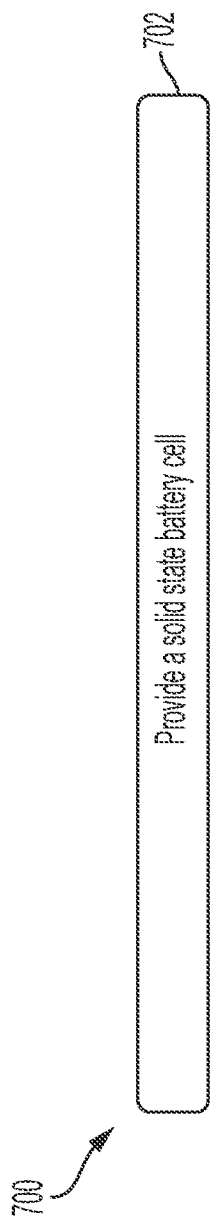
FIG. 7 shows a flow diagram of a method of providing a solid state battery cell.

FIG. 7 shows a flow diagram of a method 700. The method 700 can include providing the solid state battery cell 100 (ACT 702). Providing the solid state battery cell can include manufacturing or otherwise providing the solid state battery cell for use in an electric vehicle, such as electric vehicle 500. Providing the solid state battery cell can include assembling or manufacturing the solid state battery cell as described with regard to FIG. 6. Providing the solid state battery cell can include assembling a battery pack, such as battery pack 400, that includes one or more of the solid state battery cells described with regard to FIGS. 1-3. The method 700 can include providing the battery pack for use in an electric vehicle. The method 700 can include installing the battery pack that includes one or more of the solid state battery cells described with regard to FIGS. 1-3 in an electric vehicle.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

Systems and methods described herein may be embodied in other specific forms without departing from the characteristics thereof. For example, descriptions of positive and negative electrical characteristics (e.g., polarities) may be reversed. For example, elements described as negative elements can instead be configured as positive elements and elements described as positive elements can instead by configured as negative elements. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A solid state battery cell to power an electric vehicle, the solid state battery cell comprising:
a first polarity terminal;
a second polarity terminal;
a housing that defines a cavity, the housing including a current collector of the first polarity terminal;

a membrane disposed in the cavity and that divides the cavity into a first portion and a second portion;

an electrically conductive pin that operates as a current collector of the second polarity terminal;

an insulator that electrically isolates the electrically conductive pin from the housing;

a solid state anode material disposed in the first portion of the cavity, the solid state anode material including solid state anode particles, first solid state electrolyte particles and a first conductive additive, the solid state anode particles at least partially coated with the first solid state electrolyte particles; and a solid state cathode material disposed in the second portion of the cavity, the solid state cathode material including solid state cathode particles, second solid state electrolyte particles and a second conductive additive, the solid state cathode particles at least partially coated with the second solid state electrolyte particles, wherein:

the electrically conductive pin is disposed in the second portion of the cavity and electrically coupled with the solid state cathode material; and the membrane electrically isolating the solid state anode material from the solid state cathode material and ionically connecting the solid state anode material and the solid state cathode material.

2. The solid state battery cell of claim 1, comprising:
the housing electrically coupled with the solid state anode material.

3. The solid state battery cell of claim 1, comprising:
the housing electrically coupled with the solid state cathode material; and
the electrically conductive pin disposed in the first portion of the cavity and electrically coupled with the solid state anode material.

4. The solid state battery cell of claim 1, wherein the electrically conductive pin includes a plurality of branches.

5. The solid state battery cell of claim 1, comprising:
the solid state anode particles and the first solid state electrolyte particles suspended in a solution of the first conductive additive to form the solid state anode material; and
the solid state cathode particles and the second solid state electrolyte particles suspended in a solution of the second conductive additive to form the solid state cathode material.

6. The solid state battery cell of claim 1, wherein at least one of the first conductive additive and the second conductive additive include carbon black.

7. The solid state battery cell of claim 1, wherein the membrane is a polymer pouch.

8. The solid state battery cell of claim 1, comprising:
the membrane impregnated with third solid state electrolyte particles.

9. The solid state battery cell of claim 1, wherein the solid state battery cell is at least one of a 21700 battery cell, 20700 battery cell, 17500 battery cell, 17670 battery cell, 8350 battery cell, or 18500 battery cell.

10. The solid state battery cell of claim 1, comprising:
the solid state battery cell disposed in a battery pack installed in the electric vehicle to power the electric vehicle.

11. A method of providing a solid state battery cell to power an electric vehicle, the method comprising:
disposing a membrane in a cavity defined by a housing of the solid state battery cell to divide the cavity into a first portion and a second portion, the housing functioning as a current collector for a first polarity terminal of the solid state battery cell;

placing an electrically conductive pin in the second portion to function as a current collector for a second polarity terminal of the solid state battery cell;

preparing an anode slurry including solid state anode particles, first solid state electrolyte particles and a first conductive additive solution, the solid state anode particles at least partially coated with the first solid state electrolyte particles;

preparing a cathode slurry including solid state cathode particles, second solid state electrolyte particles and a second conductive additive solution, the solid state cathode particles at least partially coated with the second solid state electrolyte particles;

filling the first and second portions with the anode slurry and the cathode slurry such that the anode slurry and the cathode slurry are separated by the membrane, the membrane electrically isolating the anode slurry from the cathode slurry and ionically connecting the anode slurry and the cathode slurry;

placing an insulator at one end of the cavity to electrically isolate the electrically conductive pin from the housing of the solid state battery cell; and evaporating the anode slurry and the cathode slurry to form a solid state anode material in the first portion and a solid state cathode material in the second portion.

12. The method of claim 11, comprising:
filling the first portion with the anode slurry; and
filling the second portion with the cathode slurry.

13. The method of claim 11, comprising:
filling the second portion with the anode slurry; and
filling the first portion with the cathode slurry.

14. The method of claim 11, comprising:
impregnating the membrane with a third solid state electrolyte particles.

15. The method of claim 14, wherein impregnating the membrane includes:
placing the membrane in an electrolyte solution.

16. The method of claim 11, comprising:
disposing the solid state battery cell in a battery pack to power the electric vehicle.

17. The method of claim 11, wherein the electrically conductive pin includes a multi-branch conductive pin and the method comprising welding a plurality of conductive elements to form the multi-branch conductive pin.

18. The method of claim 11, wherein the first conductive additive and the second conductive additive include carbon black.

19. The method of claim 11, wherein the membrane includes a polymer pouch.

20. An electric vehicle, comprising:
a solid state battery to power the electric vehicle, the solid state battery including:
a first polarity terminal;
a second polarity terminal;
a housing defining a cavity, the housing functioning as a current collector for the first polarity terminal;
a membrane disposed in the cavity and dividing the cavity into a first portion and a second portion;
an electrically conductive pin functioning as a current collector for the second polarity terminal;
an insulator electrically isolating the electrically conductive pin from the housing;
a solid state anode material disposed in the first portion of the cavity, the solid state anode material including solid state anode particles, first solid state electrolyte particles and a first conductive additive, the solid state anode particles at least partially coated with the first solid state electrolyte particles; and a solid state cathode material disposed in the second portion of the cavity, the solid state cathode material including solid state cathode particles, second solid state electrolyte particles and a second conductive additive, the solid state cathode particles at least partially coated with the second solid state electrolyte particles, wherein:

the electrically conductive pin is disposed in the second portion of the cavity and electrically coupled with the solid state cathode material; and the membrane electrically isolating the solid state anode material from the solid state cathode material and ionically connecting the solid state anode material and the solid state cathode material.

\* \* \* \* \*